J. P. ABBOTT.
Eaves-Trough Hanger.

No. 212,530. Patented Feb. 25, 1879.

Witnesses
J. H. Lapham
R. H. Ober

Inventor
J. P. Abbott
per Burridge & Co
Attys

UNITED STATES PATENT OFFICE.

JONATHAN P. ABBOTT, OF CLEVELAND, OHIO.

IMPROVEMENT IN EAVES-TROUGH HANGERS.

Specification forming part of Letters Patent No. 212,530, dated February 25, 1879; application filed July 29, 1878.

*To all whom it may concern:*

Be it known that I, JONATHAN P. ABBOTT, of Cleveland, in the county of Cuyahoga and State of Ohio, have invented a certain new and Improved Eaves-Trough Hanger; and I do hereby declare that the following is a full, clear, and complete description thereof, reference being had to the accompanying drawings, making a part of the same.

Figure 1:
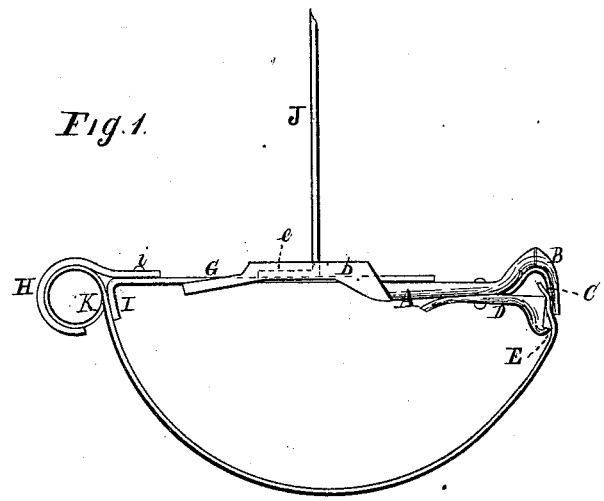
Figure 2:
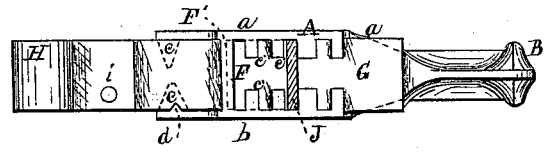
Figure 3:

Figure 1 is a side view of the hanger, shown attached to a trough. Fig. 2 is a plan view of the hanger. Fig. 3 is a detached section.

Like letters of reference refer to like parts in the several views.

This invention relates to an eaves-trough hanger, the construction of which is such that it can be easily and readily adapted to troughs differing in width, and to eaves-troughs having either a round or square bead along the outer edge, or to a bead of any particular angle and of any size in ordinary use.

A full and complete description of the hanger is as follows: The hanger above alluded to consists of a bar, A, one end of which terminates in a hook, B, provided on the inner side with a shoulder, C, Fig. 1. To the under side of the bar is pivoted a button or clamp, D, so that it may swing laterally from under the bar. The head of said clamp is provided with a lip, E, which projects outwardly and under the end of the hook, as shown in Fig. 1.

That part of the bar forward of the point $a$ is widened out and elevated above the surface of the bar to which the button is pivoted. This widening of the bar is effected by two arms, $a$ and $b$, Fig. 2, extending forward from their connection with the bar. Said arms $a$ and $b$ are attached to each other by a brace or bar, F, forming a kind of a frame of the middle and outer end of the bar, as seen in Fig. 2.

The elevation of the frame part of the bar above the upper surface of the rear or hook end is sufficient to admit of two thicknesses of strap-iron between the brace F and the surface of the hook. One of said straps of iron consists of an extension-plate, G, Fig. 2, a detached view of which is shown in Fig. 3. Said extension-plate is slipped in between the arms $a$ and $b$ and under the bar or brace F until the end rests upon the hook end of the bar A. The front end of the extension-plate rests upon a pair of ears projecting, respectively, from the front ends of the frame part of said bar A. Said ears are indicated by the dotted lines $c$, Fig. 2. Hence it will be seen that the extension-plate rests upon the surface of the bar A and the ears, and under the brace or bar F and the projections $c'$. The plate is prevented from moving endwise by a nib, $d$, projecting from the inner side of the arm $b$ into a corresponding notch cut in the edge of the extension-plate, substantially as seen in Fig. 2.

The extension-plate above referred to forms a section of the cross-bar of the hanger, and while the rear end of said plate is secured to the bar A its front end is attached to the front side of the trough by a hook, H, pivoted to the plate at the point $i$. Said hook is of a shape to fit the bead along the outer edge of the trough. To prevent the side of the trough from bending inwardly a section of the end of the extension-plate is bent downward, forming a lip or shoulder, I, against which the side of the trough is pressed by the clamping-hook H, thereby firmly attaching that end of the hanger or the bar thereof to the trough.

The opposite end of the bar is secured to the trough by the button D, between which and the end of the hook B the side of the trough is inserted and clamped, as shown in Fig. 1, wherein it is seen that the upper edge of the head of the button forces the metal of the trough into the shoulder C, thereby making a crimp in the metal. A similar crimp is made by the lip E forcing the metal of the trough under the end of the hook. The crimps thus formed in the side of the trough hold it firmly and securely to the bar, so that it cannot pull out so long as the button remains in the position shown in the said Fig. 1.

The hanger is attached to the roof by a strap, J, one of the two straps above alluded to. The lower end of said strap is bent at a right angle, forming a foot. (Indicated by the dotted line $e$, Fig. 1.) Said foot is inserted between the arms $a$ and $b$, and rests upon the plate G. The extreme end of the foot lies under the brace or bar F, as indicated by the dotted line F'. The foot also lies under the points $c'$, and is thereby prevented from lifting upward, whereas the upright part of the strap J is held in the notches formed by the projections c', substantially as shown in the drawings.

The process of attaching the hanger to the trough is as follows: The upright part of the strap J is first inserted through from the under side, the bar in either of the notches, as the width of the trough to which the hanger is to be attached may require to bring the strap to about the middle of the trough, so that it may balance. Under the foot, and between the arms a and b, is pushed the plate, so far as to bring the notch in its side to the nib d, into which it will slip and hold the plate from moving endwise. The hook H is now turned to a right angle with the plate, in which position it can be easily placed on over the bead K of the trough. When thus hooked to the bead it is then turned again to a right line with the plate and bar, the lip I holding the hook firmly in place. The inner end of the bar is now attached to the trough by turning the button D at a right angle to the bar. The hook B is then placed on over the edge of the trough, and the button then forced back under the bar, as shown in the drawings. In forcing the button to this position it forms the dents or crimps in the side of the trough by the shoulder C and lip E, which, as above said, locks that end of the bar firmly to the trough, thereby completing the fastening of the hanger to the trough.

It will be observed that the hook H is pivoted near one side of the extension-plate, and that the pivot is near one side of the hook, the object of which is to throw the edge of the hook beyond the end of the plate when the hook is turned at right angles therewith; hence the end of the plate will not be in the way of placing the hook onto the bead, which it would be were the hook pivoted in the middle of the plate and hook.

It will also be observed that the lip I is only about one-half the width of the plate, the turned-down end of the plate being cut away, leaving a narrow piece for a lip or shoulder. This narrow lip allows the hook to be turned, when first hooked to the bead, to a right line with the plate without bruising or tearing the metal of the trough, which it would do were the lip the full width of the plate. The corner of the plate opposite the lip is cut away or rounded, to facilitate the movement of the pivoted hook in connecting the bar of the hanger to the trough, or for detaching the same therefrom.

By means of the extension-plate the bar may be lengthened or shortened to adapt it to different-sized troughs.

In the drawings the bead K is represented as being round. The hanger, however, is equally well adapted to troughs having a bead of an angular form, which cornice-troughs frequently have. All that is necessary to adapt the hanger to a trough having an angular bead is to supply the bar with a hook corresponding in shape to the bead on the trough, the rest part of the hanger requiring no change, unless it is to adapt the length of the bar to the width of the trough, should that be necessary.

By using a pivoted hook, as above described, no special tools are required to apply the hanger to the trough, as the hook is already bent for clasping the outer edge of the trough, differing in this respect from the ordinary hangers, which require the hook to be bent around the edge of the trough at the time of applying it thereto.

The nib d may be placed at the rear end of the bar A, so that it may engage a notch or notches cut in the rear end of the extension-plate.

The number of notches are to correspond to the number of spaces formed by the projections c' for holding the plate in place when the bar is adjusted to any particular width of trough.

On pushing the extension-plate between the arms a and b, as and for the purpose above specified, the ends of said arms are first slightly sprung outward to allow the plate to slide by the nib d into one of the notches in the edge of the plate. The nib is then sprung by pressing the arms a and b together again.

What I claim as my invention, and desire to secure by Letters Patent, is—

1. In eaves-trough hangers, the bar A, having a hook end, B, provided with a shoulder, C, button D, arms a and b, nibs d, and projections c', all combined substantially as and for the purpose set forth.

2. The extension-plate G, having the pivoted hook H, in combination with the bar A and hanging strap, in the manner substantially as described, and for the purpose specified.

3. In eaves-trough hangers, an improvement consisting of the hook H, formed to lap over and around the bead of the trough and pivoted to the upper side of a cross-bar provided with a shoulder, I, projecting below said cross-bar, constructed and arranged substantially as set forth.

4. The bar A, provided with the projections c', in combination with the extension-plate and hanging strap, as and for the purpose specified.

JONATHAN P. ABBOTT.

Witnesses:
  W. H. BURRIDGE,
  J. W. ROPP.